United States Patent
Kimura et al.

(10) Patent No.: US 10,557,396 B2
(45) Date of Patent: Feb. 11, 2020

(54) EXHAUST SYSTEM FOR AN INTERNAL COMBUSTION ENGINE

(71) Applicant: TOYOTA JIDOSHA KABUSHIKI KAISHA, Toyota-shi, Aichi-ken (JP)

(72) Inventors: Koichi Kimura, Numazu (JP); Yasuyuki Irisawa, Susono (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 35 days.

(21) Appl. No.: 16/025,017

(22) Filed: Jul. 2, 2018

(65) Prior Publication Data
US 2019/0003366 A1  Jan. 3, 2019

(30) Foreign Application Priority Data
Jul. 3, 2017  (JP) .................. 2017-130153

(51) Int. Cl.
| | | |
|---|---|---|
| *F01N 13/08* | (2010.01) | |
| *F01N 13/00* | (2010.01) | |
| *F02D 41/14* | (2006.01) | |
| *F02D 41/02* | (2006.01) | |
| *F01N 3/10* | (2006.01) | |

(Continued)

(52) U.S. Cl.
CPC ............ *F01N 13/008* (2013.01); *F01N 3/10* (2013.01); *F02B 37/013* (2013.01); *F02D 23/00* (2013.01); *F02D 41/0255* (2013.01); *F02D 41/1454* (2013.01); *F01N 2240/36* (2013.01); *F01N 2410/00* (2013.01); *F01N 2560/025* (2013.01)

(58) Field of Classification Search
CPC ...... F01N 13/008; F01N 13/08; F01N 13/087; F01N 2240/36; F01N 2410/03; F01N 2410/06; F02B 37/183
See application file for complete search history.

(56) References Cited

U.S. PATENT DOCUMENTS

| | | | |
|---|---|---|---|
| 2008/0163623 A1 | 7/2008 | Eiraku et al. | |
| 2012/0222418 A1* | 9/2012 | Watanabe | F02B 37/183 60/602 |

(Continued)

FOREIGN PATENT DOCUMENTS

| | | |
|---|---|---|
| JP | 2003-254051 | 9/2003 |
| JP | 2007-303394 | 11/2007 |

(Continued)

*Primary Examiner* — Jonathan R Matthias
(74) *Attorney, Agent, or Firm* — Finnegan, Henderson, Farabow, Garrett & Dunner, LLP

(57) ABSTRACT

In an exhaust system for an internal combustion engine which is constructed such that when a degree of opening of a waste gate valve is equal to or larger than a predetermined degree of opening, the bypass exhaust gas flows so as to direct to a predetermined portion on the upstream side end face of the exhaust gas purification catalyst, and that the exhaust gas sensor is arranged in a specific passage, which is an exhaust passage between a turbine and the exhaust gas purification catalyst, the exhaust gas sensor is arranged to be away, a first distance or more in a direction orthogonal to an axial direction of the exhaust gas purification catalyst, from a region (scattering region B) in which the predetermined portion is virtually extended to a side of the specific passage along the axial direction of the exhaust gas purification catalyst.

4 Claims, 10 Drawing Sheets

(51) Int. Cl.
*F02B 37/013* (2006.01)
*F02D 23/00* (2006.01)

(56) References Cited

U.S. PATENT DOCUMENTS

2015/0040561 A1* 2/2015 Matsui .................. F01N 3/2006
                                                        60/602
2017/0145936 A1* 5/2017 Kimura .................... F01N 3/20

FOREIGN PATENT DOCUMENTS

| JP | 2012002094 A | * | 1/2012 |
| JP | 2012241545 A | * | 12/2012 |
| JP | 2013-204518 | | 10/2013 |
| JP | 2014-13004 | | 1/2014 |
| JP | 2014202163 A | * | 10/2014 |
| JP | 2016-173041 | | 9/2016 |

* cited by examiner

[Fig. 1]
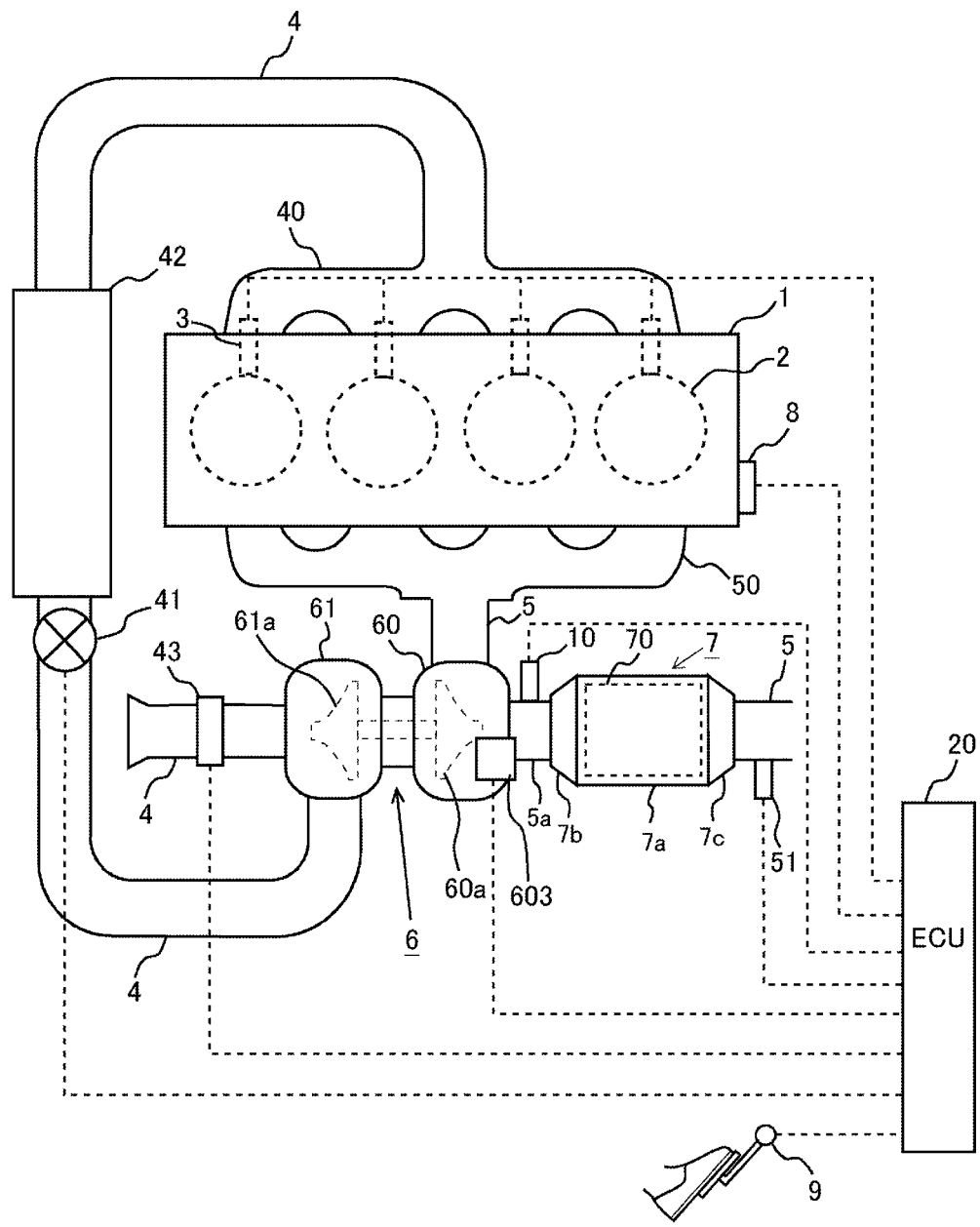

[Fig. 2A]
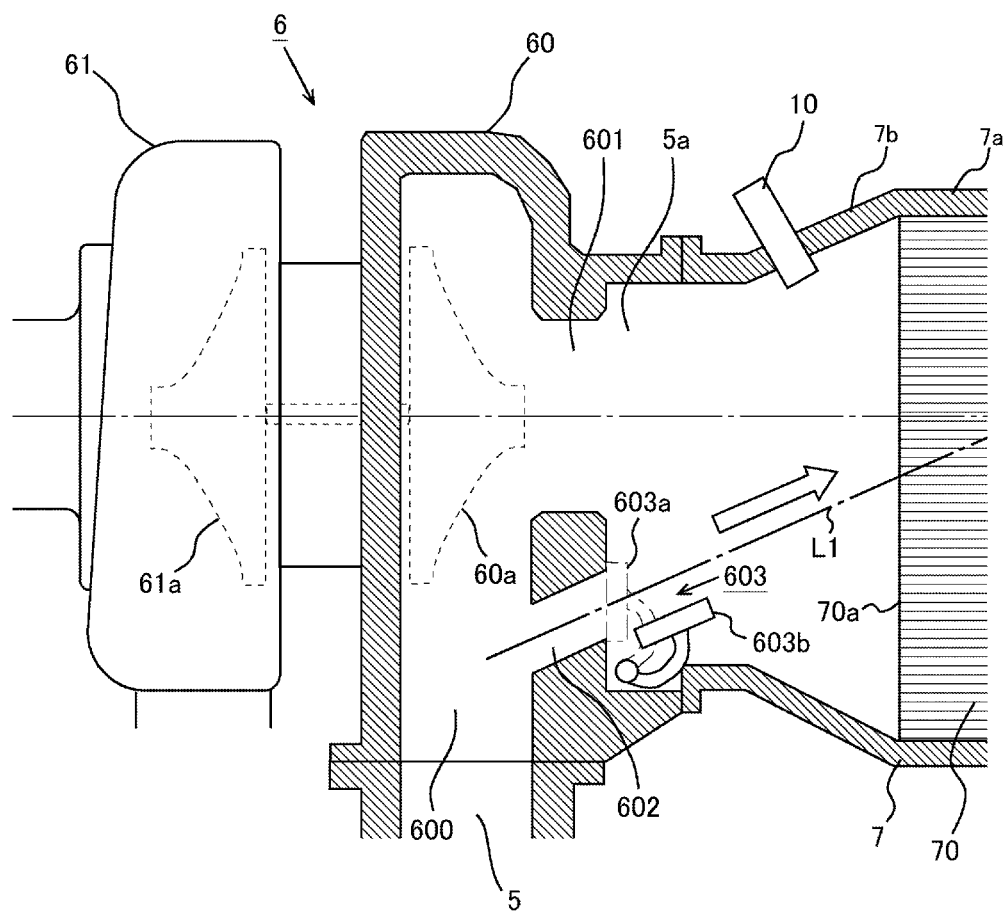

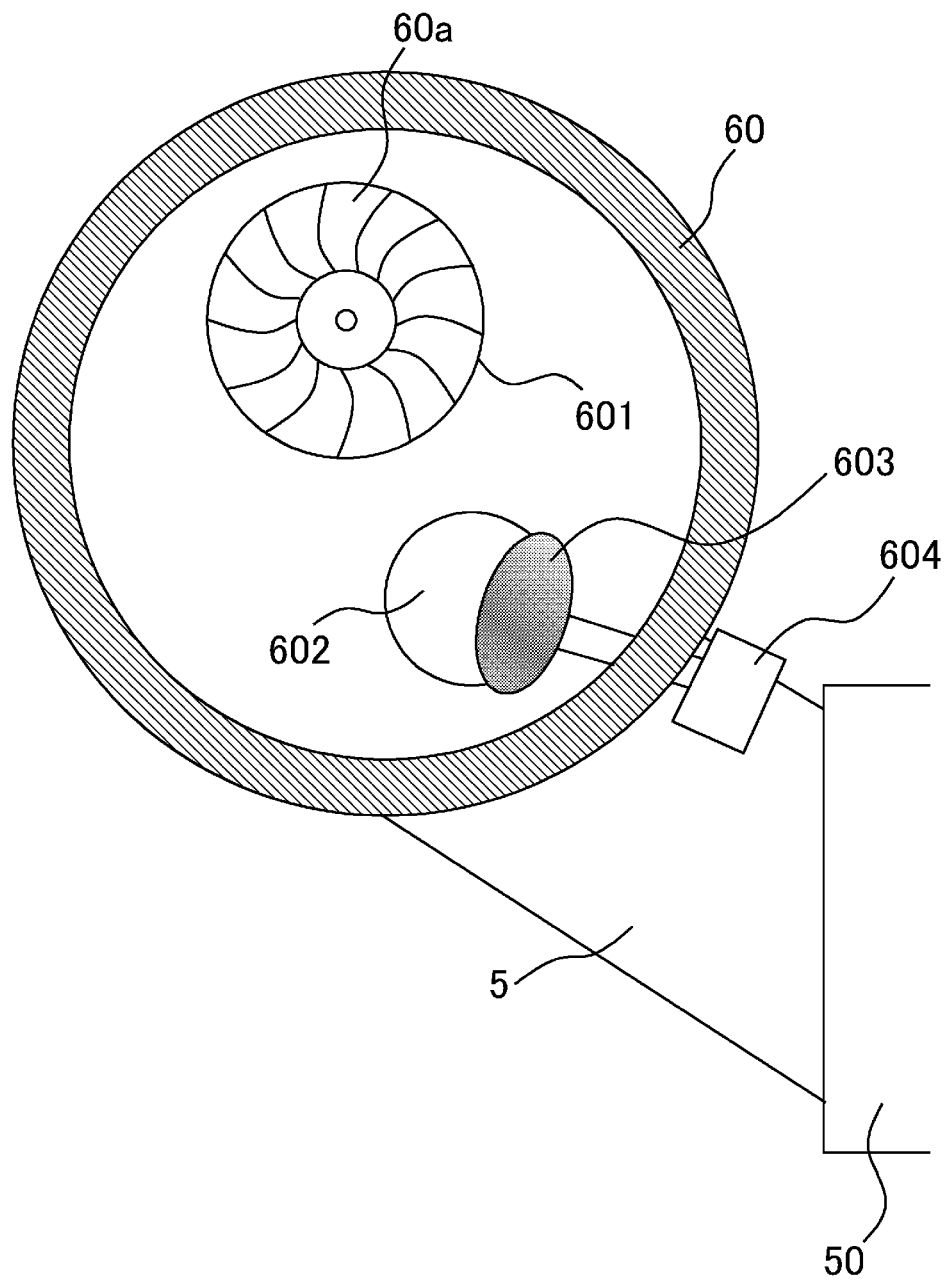
[Fig. 2B]

[Fig. 3]
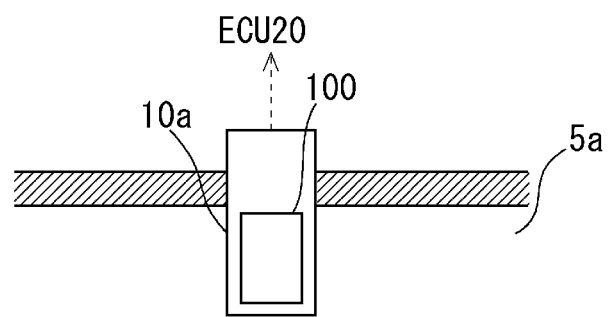

[Fig. 4]
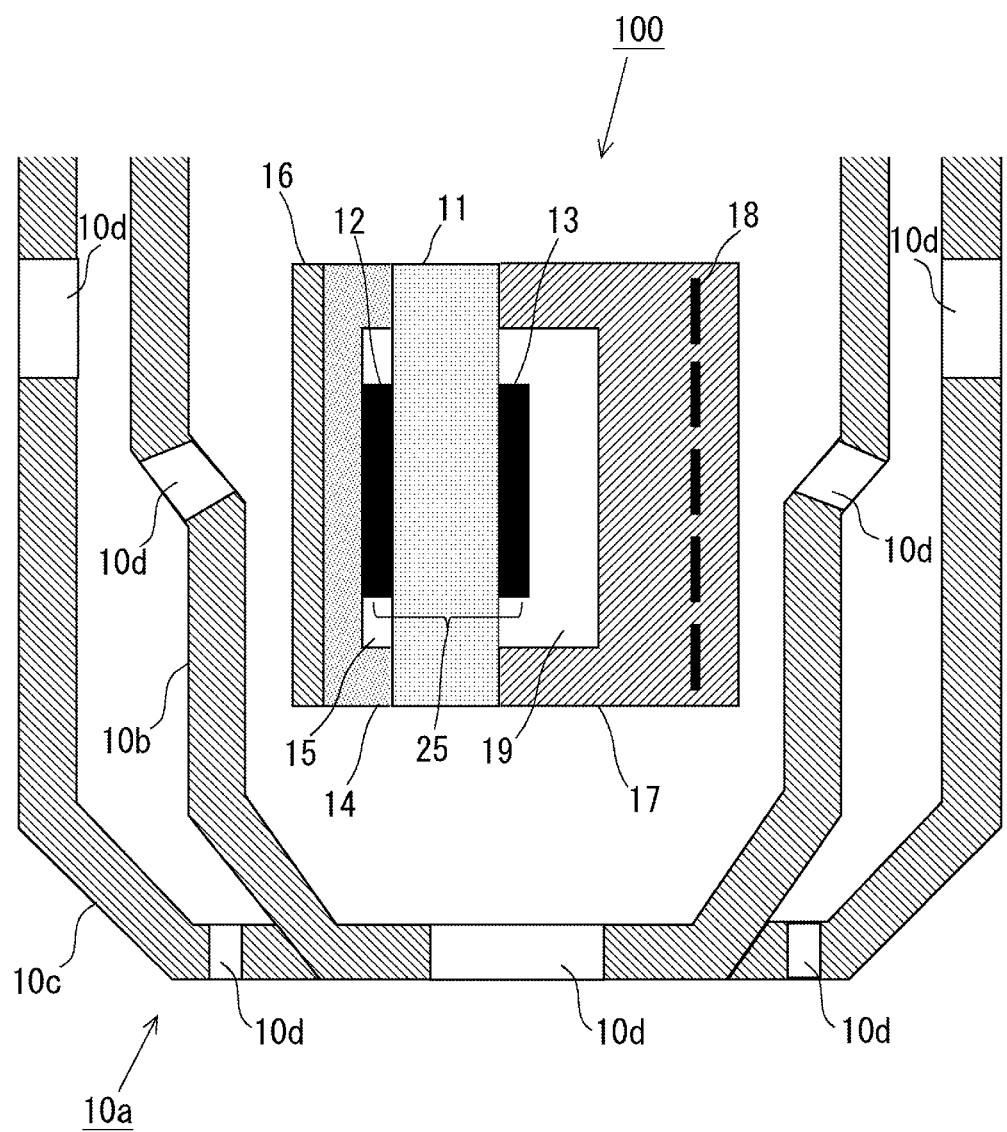

[Fig. 5]
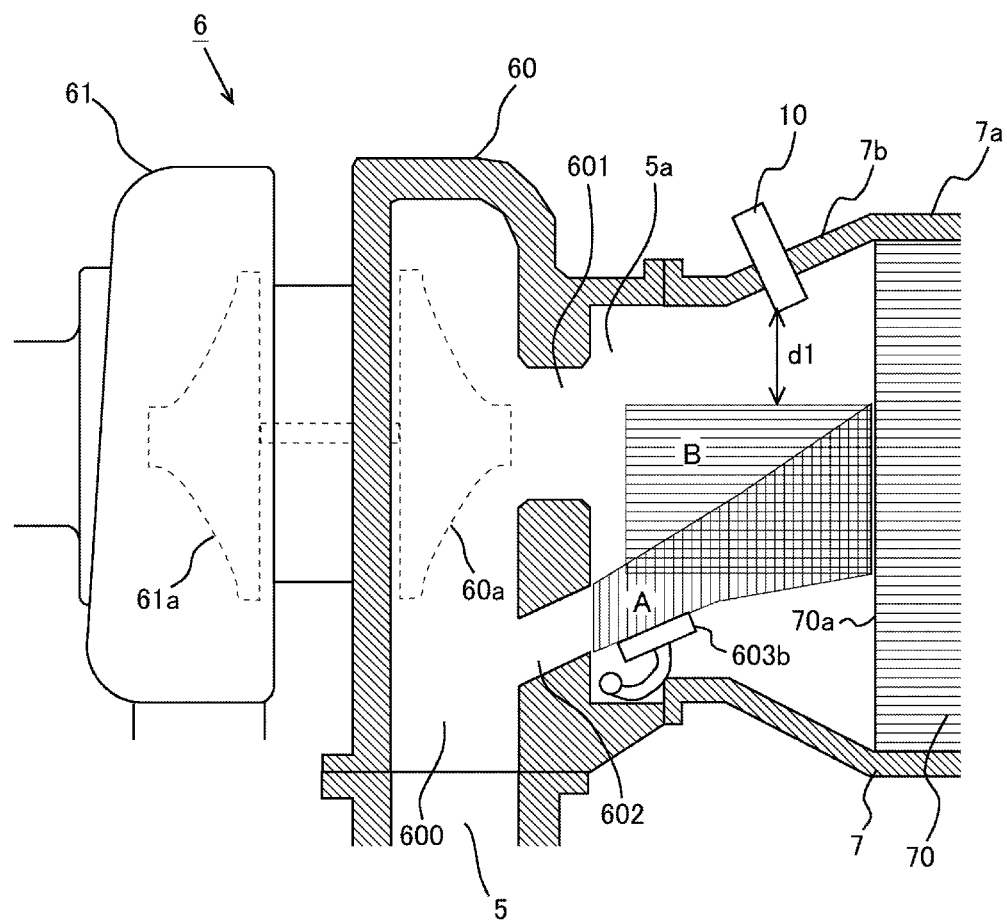

[Fig. 6]
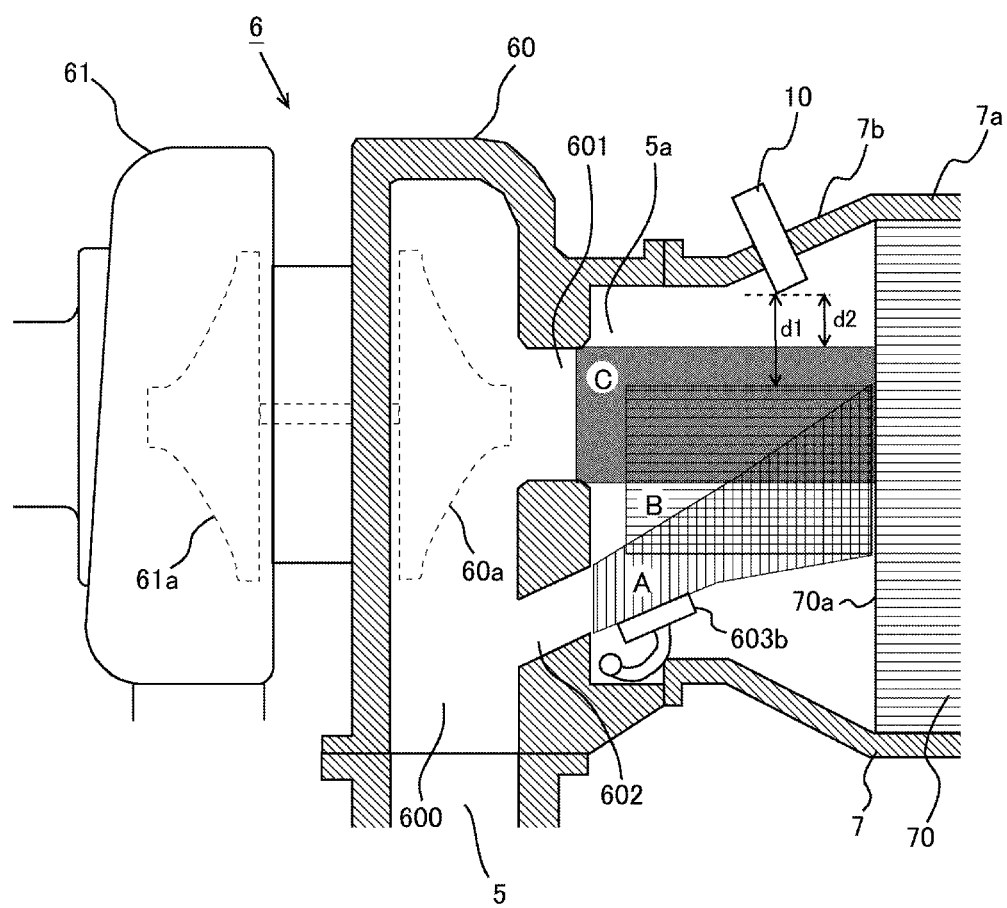

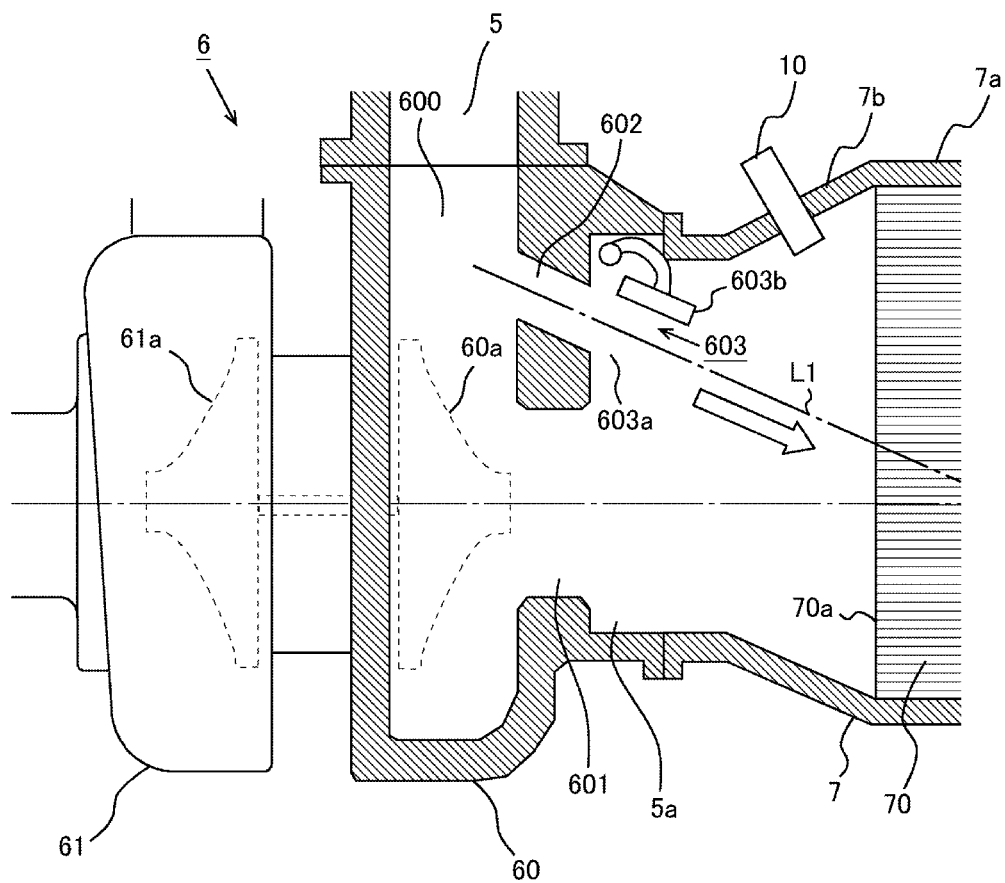
[Fig. 7A]

[Fig. 7B]
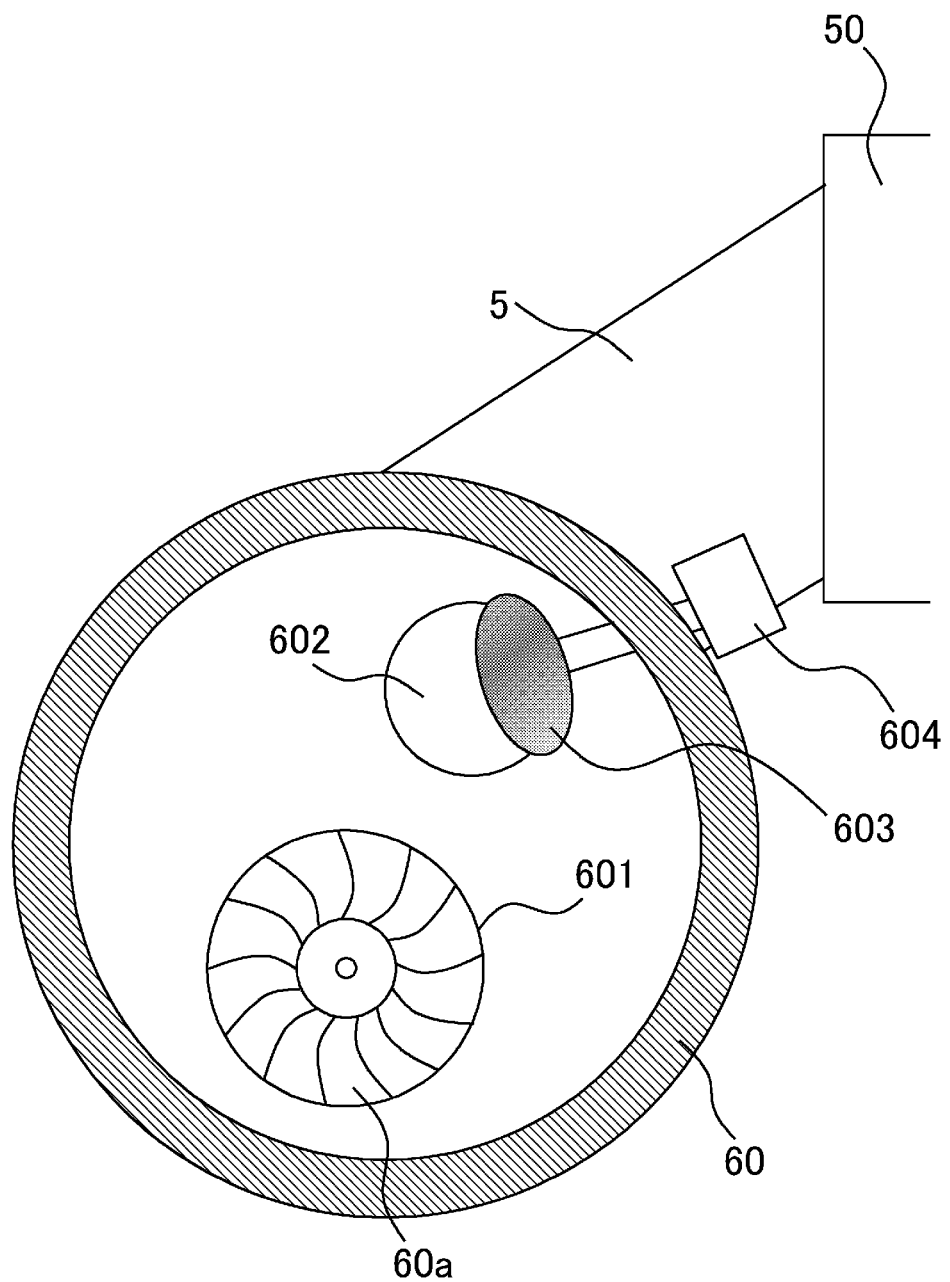

[Fig. 8]
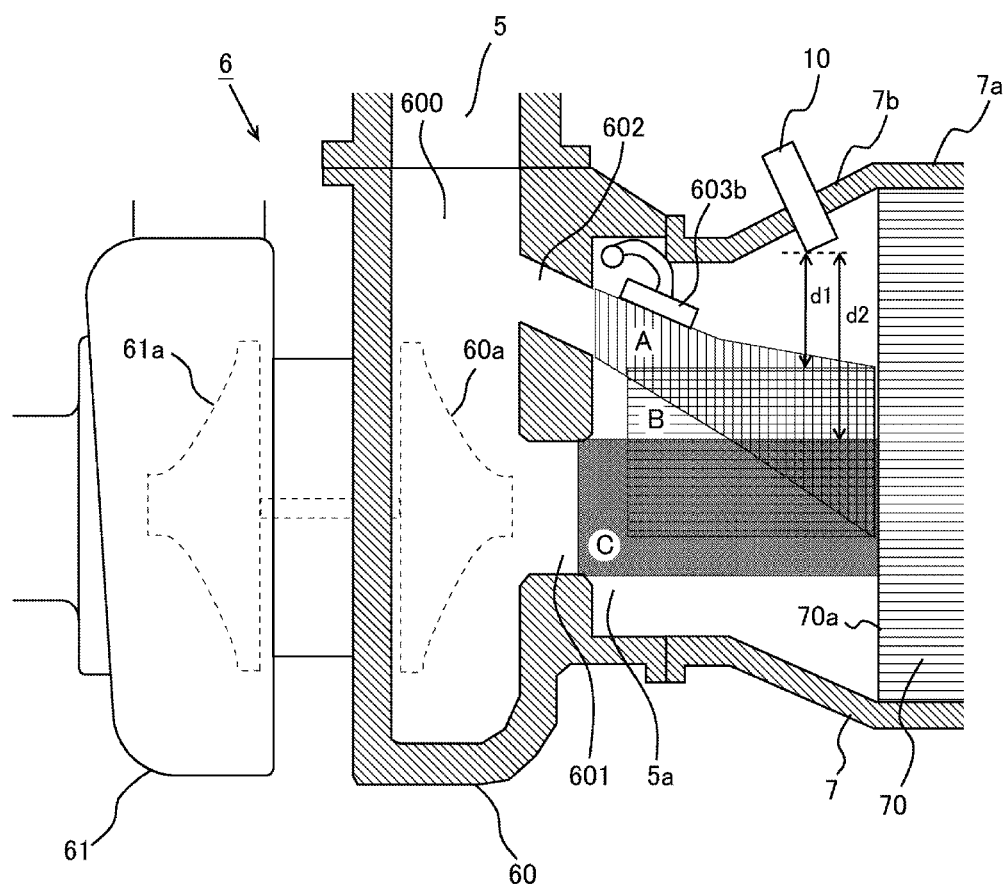

EXHAUST SYSTEM FOR AN INTERNAL COMBUSTION ENGINE

CROSS REFERENCE TO RELATED APPLICATIONS

This application claims the benefit of Japanese Patent Application No. 2017-130153, filed on Jul. 3, 2017, which is hereby incorporated by reference herein in its entirety.

BACKGROUND

Technical Field

The present disclosure relates to an exhaust system applied to an internal combustion engine which is provided with an exhaust gas turbine supercharger (turbocharger) that drives a compressor of centrifugal type using exhaust gas energy, an exhaust gas purification catalyst that is arranged at the downstream side of a turbine of the turbocharger, and an exhaust gas sensor that is arranged between the turbine and the exhaust gas purification catalyst.

Description of the Related Art

In recent years, with internal combustion engines equipped with a turbocharger, an exhaust passage structure has become common in which an exhaust gas purification catalyst is arranged in an exhaust passage downstream of a turbine of the turbocharger at a location in the vicinity of the turbine for the purpose of early warming up the exhaust gas purification catalyst in a cold period thereof. In addition, with internal combustion engines which are each provided, in combination with a turbocharger, with a bypass passage bypassing a turbine and a waste gate valve (hereinafter, referred to as a "WGV") for changing the channel cross section of the bypass passage, there is also known a structure in which the bypass passage, the WGV, etc., are arranged in such a manner that an exhaust gas having passed through the bypass passage (hereinafter, referred to as a "bypass exhaust gas") directly contacts or impinges against an upstream side end face of an exhaust gas purification catalyst. According to such a structure, the warming-up of the exhaust gas purification catalyst can be further promoted by directly applying the exhaust gas of high temperature having bypassed the turbine to the upstream side end face of the exhaust gas purification catalyst in a cold period thereof.

However, in order to use the purification ability of an exhaust gas purification catalyst in an effective manner, it is necessary to grasp the state of exhaust gas flowing into an exhaust gas purification catalyst. For that reason, an exhaust passage structure has also become popular in which an exhaust gas sensor such as an oxygen concentration sensor, an air fuel ratio sensor, etc., for detecting the concentration of a specific component contained in the exhaust gas is arranged in an exhaust passage at a location upstream of the exhaust gas purification catalyst. Here, in cases where an exhaust gas sensor is arranged in an exhaust passage of an internal combustion engine equipped with a turbocharger, there is also known a structure in which the exhaust gas sensor is arranged at a location as close as possible to an exhaust gas purification catalyst in a relatively narrow range between a turbine and the exhaust gas purification catalyst, so that a gas including an exhaust gas having passed through the turbine (hereinafter, sometimes referred to as a "turbine exhaust gas") and a bypass exhaust gas mixed with each other contacts or impinges against the exhaust gas sensor (see, for example, patent literature 1).

CITATION LIST

Patent Literature

Patent Literature 1: Japanese patent application laid-open publication No. 2016-173041
Patent Literature 2: Japanese patent application laid-open publication No. 2003-254051

SUMMARY

However, moisture is contained in the exhaust gas of an internal combustion engine, and the moisture may become condensed water in a cold period of the internal combustion engine such as during a stop period thereof, so that it may stay in an exhaust passage upstream of a turbine, the turbine, a bypass passage, etc. When the condensed water is generated in those places, it may flow out from an outlet portion of the turbine or an outlet portion of the bypass passage toward an exhaust gas purification catalyst, immediately after the internal combustion engine has been cold started, etc. In particular, in the exhaust passage structure which is constructed such that the bypass exhaust gas impinges directly against the upstream side end face of the exhaust gas purification catalyst, the condensed water having flowed out from the outlet portion of the bypass passage together with the bypass exhaust gas may contact or impinge directly against the upstream side end face of the exhaust gas purification catalyst. In the warming-up process of the exhaust gas purification catalyst, when the condensed water contained in the bypass exhaust gas contacts or impinges against the upstream side end face of the exhaust gas purification catalyst, the condensed water may boil on the upstream side end face of the exhaust gas purification catalyst. In that case, a part of the condensed water may be scattered from the upstream side end face of the exhaust gas purification catalyst to an upstream side in the direction of the flow of the exhaust gas. At that time, if an exhaust gas sensor is arranged in the vicinity of the exhaust gas purification catalyst, as disclosed in the above-mentioned patent literature 1, there is a fear that the moisture scattered upon the boiling of the condensed water may impinge against the exhaust gas sensor, thereby inducing abnormality in the exhaust gas sensor.

The present disclosure has been made in view of the actual circumstances as referred to above, and an object of the present disclosure is that in a construction in which a turbine and an exhaust gas purification catalyst are arranged close to each other, and in which an exhaust gas sensor is arranged in an exhaust passage between the turbine and the exhaust gas purification catalyst, the exhaust gas sensor is suppressed from getting wet with water, resulting from moisture splashing or scattering when condensed water contained in a bypass exhaust gas boils on an upstream side end face of the exhaust gas purification catalyst.

In order to solve the above-mentioned problems, the present disclosure resides in an exhaust system for an internal combustion engine which is constructed such that when a degree of opening of a waste gate valve is equal to or larger than a predetermined degree of opening, an exhaust gas flowing out from a bypass passage (hereinafter, a bypass exhaust gas) flows so as to direct to a predetermined portion which is a part of an upstream side end face of an exhaust gas purification catalyst, and that an exhaust gas sensor is arranged in an exhaust passage between a turbine and the exhaust gas purification catalyst, wherein the exhaust gas sensor is arranged in a position where moisture splashing or scattering when condensed water contained in the bypass exhaust gas boils on an upstream side end face of the exhaust gas purification catalyst does not contact or impinge against the exhaust gas sensor.

Specifically, the present disclosure provides an exhaust system for an internal combustion engine which comprises: a supercharger with a turbine that is arranged in an exhaust passage of the internal combustion engine; an exhaust gas purification catalyst that is arranged in the exhaust passage at a location downstream of the turbine; a bypass passage that branches from the exhaust passage at a location upstream of the turbine, and merges into the exhaust passage at a location upstream of the exhaust gas purification catalyst, while bypassing the turbine; a waste gate valve that changes an exhaust gas channel cross section in the bypass passage; and an exhaust gas sensor that is arranged in a specific passage which is a portion of the exhaust passage between the turbine and the exhaust gas purification catalyst. In this exhaust system for an internal combustion engine, the turbine and the exhaust gas purification catalyst are arranged in such a manner that they are in a predetermined proximity state, and that an extension line of an axis of an outlet portion of the turbine intersects an upstream side end face of the exhaust gas purification catalyst, without intersecting a wall surface of the specific passage. Moreover, the bypass passage and the waste gate valve are constructed such that a bypass exhaust gas, which is an exhaust gas flowing out from the bypass passage when a degree of opening of the waste gate valve is equal to or larger than a predetermined degree of opening, flows so as to direct to a predetermined portion which is a part of the upstream side end face of the exhaust gas purification catalyst. Then, the exhaust gas sensor is arranged to be away, a first distance or more in a direction orthogonal to an axial direction of the exhaust gas purification catalyst, from a region in which the predetermined portion is virtually extended to a side of the specific passage along the axial direction of the exhaust gas purification catalyst.

In the exhaust system for an internal combustion engine as constructed in the above-mentioned manner, in cases where it is necessary to warm up the exhaust gas purification catalyst, as in the case where the internal combustion engine is in a cold state, when the degree of opening of the waste gate valve is made equal to or larger than the predetermined degree of opening, at least a part of the exhaust gas of high temperature discharged from the internal combustion engine flows out into the specific passage by way of the bypass passage. Because the heat possessed by the exhaust gas can not be easily taken by the turbine, the exhaust gas passing through the bypass passage becomes higher in temperature than the exhaust gas passing through the turbine. Then, when the degree of opening of the waste gate valve is equal to or larger than the predetermined degree of opening, the exhaust gas (bypass exhaust gas) flowing out from the bypass passage into the specific passage flows so as to direct to the predetermined portion of the upstream side end face of the exhaust gas purification catalyst (hereinafter, sometimes referred to as an "upstream side catalyst end face). In that case, the turbine and the exhaust gas purification catalyst are arranged in a predetermined proximity state. The "predetermined proximity state" referred to herein is a state where most of the bypass exhaust gas impinges directly against the predetermined portion of the upstream side catalyst end face, without colliding with the wall surface of the specific passage, etc. As a result, the amount of the exhaust gas impinging directly against the upstream side catalyst end face without colliding with the wall surface of the specific passage, etc., among the bypass exhaust gas increases. Here, note that when the bypass exhaust gas collides with the wall surface of the specific passage, etc., before reaching the upstream side catalyst end face, the heat of the bypass exhaust gas is transmitted to the wall surface, etc., so the amount of heat to be transmitted from the bypass exhaust gas to the exhaust gas purification catalyst is apt to decrease. On the other hand, by arranging the turbine and the exhaust gas purification catalyst in the predetermined proximity state, most of the bypass exhaust gas impinges directly against the predetermined portion of the upstream side catalyst end face, without colliding with the wall surface of the specific passage, etc., so that the heat of the bypass exhaust gas can be made to transmit to the exhaust gas purification catalyst in an efficient manner. As a result, the warming-up of the exhaust gas purification catalyst can be promoted.

However, the bypass exhaust gas mentioned above may contain condensed water generated during the stop of operation of the internal combustion engine, etc. In the warming-up process of the exhaust gas purification catalyst, when the bypass exhaust gas containing the condensed water impinges against the upstream side catalyst end face in a state where the upstream side catalyst end face has got warm to some extent, the condensed water may boil on the upstream side catalyst end face. When the condensed water boils on the upstream side catalyst end face, moisture (hereinafter, sometimes referred to as "backflow water") may be generated which splashes or scatters toward the specific passage side from the upstream side catalyst end face. Here, in cases where the turbine and the exhaust gas purification catalyst are arranged in such a manner that they are in the predetermined proximity state, and that the extension line of the axis of the outlet portion of the turbine intersects the upstream side end face of the exhaust gas purification catalyst, without intersecting the wall surface of the specific passage, as mentioned above, in other words, in cases where the specific passage is formed of a substantially straight short passage, when the exhaust gas sensor is arranged carelessly in the specific passage, the exhaust gas sensor may get wet with the backflow water mentioned above. Here, note that the above-mentioned backflow water is apt to scatter in a direction parallel to the axial direction of the exhaust gas purification catalyst. In other words, the backflow water mentioned above has a tendency to splash or scatter substantially vertically with respect to the upstream side catalyst end face in a direction from the upstream side catalyst end face toward the specific passage. Accordingly, it can be estimated that the backflow water mentioned above scatters to a region (hereinafter, sometimes referred to as a "scattering region") to which a location (a predetermined location) on the upstream side catalyst end face with which the condensed water collides is virtually extended to the specific passage side along the axial direction of the exhaust gas purification catalyst. For that reason, when the exhaust gas sensor is arranged in the scattering region, the exhaust gas sensor becomes apt to get wet with the backflow water.

As a method of preventing the exhaust gas sensor from getting wet with water resulting from the above-mentioned backflow water, there can be considered a method of making a distance between the exhaust gas sensor and the upstream side catalyst end face in a direction parallel to the axial direction of the exhaust gas purification catalyst longer than a scattering distance of the backflow water. However, in order to adopt such a method, it is necessary to make the specific passage long. On the other hand, in order to attain the warming-up of the exhaust gas purification catalyst by the use of the heat of the bypass exhaust gas as referred to above in an efficient manner, it is necessary to make the specific passage as short as possible. For that reason, the method of making the distance between the exhaust gas sensor and the upstream side catalyst end face in the direction parallel to the axial direction of the exhaust gas purification catalyst sufficiently longer than the scattering distance of the backflow water can not be the a method suitable for emission conditions required of recent internal combustion engines.

Accordingly, in the exhaust system for an internal combustion engine of the present disclosure, the exhaust gas sensor is arranged in a position separated by the first distance or more from the scattering region in the direction orthogonal to the axial direction of the exhaust gas purification catalyst (i.e., in a direction parallel to the upstream side catalyst end face). According to such an arrangement, in the construction in which the turbine and the exhaust gas purification catalyst are arranged close to each other, and in which the exhaust gas sensor is arranged in the specific passage between the turbine and the exhaust gas purification catalyst, the wetting with water of the exhaust gas sensor resulting from the backflow water can be suppressed. In other words, it becomes possible to suppress the wetting of the exhaust gas sensor resulting from the backflow water, while making it possible to carry out the warming-up of the exhaust gas purification catalyst with the use of the bypass exhaust gas in an efficient manner.

However, a part of the backflow water may scatter, while spreading in the direction orthogonal to the axial direction of the exhaust gas purification catalyst. For that reason, the first distance mentioned above may be set to a distance at which the backflow water scattering while spreading in the direction orthogonal to the axial direction of the exhaust gas purification catalyst does not contact or impinge against the exhaust gas sensor. When the first distance is set in this manner, it becomes possible to suppress the wetting of the exhaust gas sensor resulting from the backflow water in a more reliable manner.

In the exhaust system for an internal combustion engine according to the present disclosure, the exhaust gas sensor may be arranged in a position which is separated with respect to the scattering region by the first distance or more in the direction orthogonal to the axial direction of the exhaust gas purification catalyst, and which is further separated, by a second distance or more in a direction orthogonal to the axial direction of the outlet portion, with respect to a region in which an end face of the outlet portion of the turbine is virtually extended to the specific passage side along the axial direction of the outlet portion.

When the internal combustion engine is in the cold state, condensed water may be contained in the exhaust gas flowing out from the outlet portion of the turbine (hereinafter, sometimes referred to as a "turbine exhaust gas"), as in the bypass exhaust gas. Here, most of the turbine exhaust gas flows spirally, while swirling around the central axis of the turbine. On the other hand, the specific gravity of the condensed water contained in the turbine exhaust gas is larger than that of the exhaust gas, so the condensed water is easy to advance linearly in the direction parallel to the axial direction of the turbine outlet portion (i.e., an extension line of the axis of the turbine outlet portion). Accordingly, when the exhaust gas sensor is arranged in a region in which the end face of the turbine outlet portion is extended to the specific passage side along the axial direction of the turbine outlet portion (hereinafter, sometimes referred to as a "turbine condensed water circulation region"), the exhaust gas sensor may get wet with the condensed water having flowed out from the turbine into the specific passage. On the other hand, when the exhaust gas sensor is arranged in a position in which a separation distance between the exhaust gas sensor and the scattering region in the direction orthogonal to the axial direction of the exhaust gas purification catalyst becomes equal to or larger than the first distance, and in which a separation distance between the exhaust gas sensor and the turbine condensed water circulation region in the direction orthogonal to the axial direction of the turbine outlet portion becomes equal to or larger than the second distance, it is possible to suppress the wetting of the exhaust gas sensor resulting from the condensed water contained in the turbine exhaust gas, too, in addition to the wetting of the exhaust gas sensor resulting from the backflow water.

Here, a part of the condensed water flowing out from the outlet portion of the turbine may circulate or flow, while spreading in the direction orthogonal to the axial direction of the turbine outlet portion. For that reason, the second distance may be set to a distance at which the condensed water circulating or flowing while spreading in the direction orthogonal to the axial direction of the turbine output portion does not contact or impinge against the exhaust gas sensor. When the second distance is set in this manner, it becomes possible to suppress the wetting of the exhaust gas sensor resulting from the condensed water contained in the turbine exhaust gas in a more reliable manner.

Here, note that the specific passage according to the present disclosure may be constructed to include a tapered portion in which the passage diameter of the specific passage continuously increases from an intermediate portion extending from the turbine to the exhaust gas purification catalyst. In that case, the exhaust gas sensor may be arranged in the tapered portion. Here, from the view point of suppressing the wetting of the exhaust gas sensor resulting from the backflow water and the wetting of the exhaust gas sensor resulting from the condensed water contained in the turbine exhaust gas in a more reliable manner, it is desirable that the first distance and the second distance be set as long as possible. On the other hand, the tapered portion has a channel cross sectional area larger than that of the specific passage upstream of the tapered portion, so it is easy to make the first distance and the second distance longer. Accordingly, if the exhaust gas sensor is arranged in the tapered portion, it will become easy to suppress the wetting of the exhaust gas sensor resulting from the backflow water and the wetting of the exhaust gas sensor resulting from the condensed water contained in the turbine exhaust gas in a more reliable manner. In addition, the position of the tapered portion when seen from the turbine outlet portion is a secluded position away in the radial direction of the specific passage, so it is easy to suppress the wetting of the exhaust gas sensor resulting from the condensed water contained in the turbine exhaust gas.

According to the present disclosure, in a construction in which a turbine and an exhaust gas purification catalyst are arranged close to each other, and in which an exhaust gas sensor is arranged in an exhaust passage between the turbine and the exhaust gas purification catalyst, the exhaust gas sensor can be suppressed from getting wet with water, resulting from moisture splashing or scattering when condensed water contained in a bypass exhaust gas boils on an upstream side end face of the exhaust gas purification catalyst.

BRIEF DESCRIPTION OF DRAWINGS

FIG. 1 is a view showing the schematic construction of an internal combustion engine with its exhaust system to which the present disclosure is applied.

FIG. 2A is a view showing a vertical cross section of a turbine housing according to a first embodiment of the present disclosure.

FIG. 2B is a view showing a transverse cross section of the turbine housing according to the first embodiment of the present disclosure.

FIG. 3 is an enlarged schematic cross sectional view in the vicinity of an air fuel ratio sensor in FIG. 1.

FIG. 4 is a vertical cross sectional view in the vicinity of a tip end of the air fuel ratio sensor.

FIG. 5 is a view showing an arrangement structure of the air fuel ratio sensor in the first embodiment of the present disclosure.

FIG. 6 is a view showing an arrangement structure of an air fuel ratio sensor in a second embodiment of the present disclosure.

FIG. 7A is a view showing a vertical cross section of a turbine housing according to a modification of the second embodiment of the present disclosure.

FIG. 7B is a view showing a transverse cross section of the turbine housing according to the modification of the second embodiment of the present disclosure.

FIG. 8 is a view showing an arrangement structure of an air fuel ratio sensor in the modification of the second embodiment of the present disclosure.

DESCRIPTION OF EMBODIMENTS

Hereinafter, modes (or embodiments) for carrying out the present disclosure will be described in detail by way of example with reference to the attached drawings. However, the dimensions, materials, shapes, relative arrangements and so on of component parts described in the embodiments are not intended to limit the scope of the present disclosure to these alone in particular as long as there are no specific statements.

(First Embodiment)

<Schematic Construction of Internal Combustion Engine and its Exhaust System>

FIG. 1 is a view showing the schematic construction of an internal combustion engine and its exhaust system according to a first embodiment of the present disclosure. The internal combustion engine 1 shown in FIG. 1 is a spark ignition type internal combustion engine (gasoline engine) provided with four cylinders 2. However, the present disclosure can also be applied to a compression ignition type internal combustion engine (diesel engine). On the internal combustion engine 1, there are mounted fuel injection valves 3 for injecting fuel into the individual cylinders 2, respectively. Here, note that the fuel injection valves 3 may be constructed in such a manner as to directly inject fuel into the individual cylinders 2. In addition, on the individual cylinders 2, there are mounted spark plugs (illustration omitted) for igniting air fuel mixtures in the cylinders, respectively.

An intake manifold 40 is connected to the internal combustion engine 1, and an intake passage 4 is connected to the intake manifold 40. In the middle of this intake passage 4, there is arranged a compressor housing 61 of a supercharger 6 that is driven to operate with the use of the energy of exhaust gas as a driving source. A compressor 61a is rotatably accommodated in the compressor housing 61. Then, a throttle valve 41 is arranged in the intake passage 4 at the downstream side of the compressor housing 61. The throttle valve 41 serves to adjust the amount of intake air in the internal combustion engine 1 by changing the intake air channel cross sectional area of the intake passage 4. In addition, in the intake passage 4 at the downstream side of the throttle valve 41, there is arranged an intercooler 42 for performing heat exchange between intake air and outside air. Also, an air flow meter 43 is arranged in the intake passage 4 at the upstream side of the compressor housing 61. The air flow meter 43 outputs an electrical signal corresponding to an amount (mass) of intake air (air) flowing in the intake passage 4.

The internal combustion engine 1 is connected to an exhaust manifold 50, and an exhaust passage 5 is connected to the exhaust manifold 50. Then, in the middle of the exhaust passage 5, there are arranged a turbine housing 60 of the supercharger 6, an air fuel ratio sensor 10 and a catalyst casing 7, and a temperature sensor 51 in order from an upstream side in the direction of flow of the exhaust gas. A turbine 60a is rotatably accommodated in the turbine housing 60. In addition, the catalyst casing 7 is composed of a cylindrical portion 7a with an exhaust gas purification catalyst 70 accommodated therein, a conical portion 7b (corresponding to a "tapered portion" according to the present disclosure) arranged at the upstream side of the cylindrical portion 7a, and a conical portion 7c arranged at the downstream side of the cylindrical portion 7a. The exhaust gas purification catalyst 70 is, for example, a three-way catalyst, an oxidation catalyst or the like. In addition, the air fuel ratio sensor 10 is arranged in a specific passage 5a, which is a portion of the exhaust passage between the turbine 60a and the exhaust gas purification catalyst 70, so that it outputs an electrical signal corresponding to the air fuel ratio of the exhaust gas flowing into the exhaust gas purification catalyst 70. The details of this air fuel ratio sensor 10 will be described later. Also, the temperature sensor 51 outputs an electrical signal corresponding to the temperature of the exhaust gas. Here, note that in this embodiment, the air fuel ratio sensor 10 corresponds to an exhaust gas sensor according to the present disclosure. However, the exhaust gas sensor according to the present disclosure is not limited to the air fuel ratio sensor 10, as will be described later.

Here, the turbine housing 60 is provided with a turbine inlet portion 600 for introducing exhaust gas from the exhaust passage 5 to the turbine 60a, and a turbine outlet portion 601 that introduces the exhaust gas having passed through the turbine 60a to the specific passage 5a, as shown in FIG. 2A and FIG. 2B. In addition, a bypass passage 602 for introducing the exhaust gas from the exhaust passage 5 to the specific passage 5a by bypassing the turbine 60a is formed in the turbine housing 60. Then, the bypass passage 602 is constructed so that an extension line (an alternate long and short dash line L1 in FIG. 2A) of the axis of the bypass passage 602 intersects a part of an upstream side end face 70a (hereinafter, sometimes referred to as an "upstream side catalyst end face 70a") of the exhaust gas purification catalyst 70. Here, note that in the example shown in FIG. 2A, it is constructed such that the extension line L1 of the axis of the bypass passage 602 intersects the central portion of the upstream side catalyst end face 70a, but it may be constructed such that the extension line L1 intersects a portion of the upstream side catalyst end face 70a other than the central portion thereof. In addition, the turbine 60a and the exhaust gas purification catalyst 70 are constructed so that the extension line of the axis of the turbine outlet portion 601 intersects the upstream side catalyst end face 70a, without intersecting the wall surface of the specific passage 5a. In other words, the turbine 60a and the exhaust gas purification catalyst 70 are constructed so that the specific passage 5a takes a substantially linear shape.

In addition, the turbine housing 60 is provided with a waste gate valve 603 (hereinafter, sometimes referred to as a "WGV 603") which is arranged at the outlet side of the bypass passage 602, and which can change an exhaust gas channel cross sectional area in the bypass passage 602. This WGV 603 is driven to open and close by means of an actuator 604. Here, in FIG. 2A, there are shown a state where the WGV 603 is in a fully closed state (603a shown by a dotted line in FIG. 2A), and a state where the WGV 603 is in a fully opened state (603b shown by a solid line in FIG. 2A). Then, the direction of flow of the exhaust gas (the bypass exhaust gas) flowing out from the bypass passage 602 into the specific passage 5a when the WGV 603 is in the fully opened state becomes a direction along the extension line L1 of the axis of the bypass passage 602, as shown by an outlined arrow in FIG. 2A. In other words, the bypass passage 602 directs the direction of the flow of the bypass exhaust gas to the central portion of the upstream side catalyst end face 70a, in the state where the WGV 603 is in the fully opened state. Accordingly, note that in this embodiment, the fully opened degree of the WGV 603 corresponds to a predetermined degree of opening in the present disclosure.

Here, note that in this embodiment, as shown in FIG. 2B, the exhaust passage 5 connected to the exhaust manifold 50 extends at one end thereof toward an upper side in the vertical direction in a vehicle-mounted state, and the other end of the exhaust passage 5, which is opposite to the side connected to the exhaust manifold 50, is connected to the turbine housing 60. In the turbine housing 60 connected to such an exhaust passage 5, the turbine 60a is arranged upper in the vertical direction than the bypass passage 602.

Moreover, in the exhaust system for an internal combustion engine according to this embodiment, the turbine 60a and the exhaust gas purification catalyst 70 are arranged in a predetermined proximity state. The "predetermined proximity state" referred to herein means a state in which the turbine 60a and the exhaust gas purification catalyst 70 are arranged at such a distance that when the WGV 603 is in the fully opened state, most of the bypass exhaust gas, which is the exhaust gas flowing out from the bypass passage 602, impinges directly against the central portion of the upstream side catalyst end face 70a, without contacting the wall surface of the specific passage 5a, etc. A condition in which such a predetermined proximity state is satisfied is, for example, that a value obtained by dividing the value of the distance from the turbine outlet portion 601 to the upstream side catalyst end face 70a by the value of the diameter of the exhaust gas purification catalyst 70 falls into a range of from 0.8 to 1.3. In this embodiment, such a condition is, for example, that the value of the distance from the turbine outlet portion 601 to the upstream side catalyst end face 70a is 100 mm, and that the value of the diameter of the exhaust gas purification catalyst 70 is 120 mm. Then, when the turbine 60a and the exhaust gas purification catalyst 70 are arranged in the predetermined proximity state in this manner, heat dissipation from the exhaust gas to the passage wall in the specific passage 5a is suppressed. In addition, as mentioned above, when the bypass exhaust gas flows directing to the central portion of the upstream side catalyst end face 70a in the state where the WGV 603 is in the fully opened state, even if the bypass exhaust gas spreads in a radial direction to some extent, a large part of the exhaust gas will impinge directly against the central portion of the upstream side catalyst end face 70a, so the heat of the bypass exhaust gas can be transmitted to the exhaust gas purification catalyst 70 in an efficient manner.

Here, reverting to FIG. 1, an electronic control unit (ECU) 20 is provided in combination with the internal combustion engine 1. This ECU 20 is a unit that controls an operating state, etc., of the internal combustion engine 1. A variety of kinds of sensors such as a crank position sensor 8, an accelerator opening sensor 9, etc,. in addition to the air fuel ratio sensor 10, the air flow meter 43 and the temperature sensor 51 mentioned above are electrically connected to the ECU 20. The crank position sensor 8 is a sensor which outputs an electrical signal correlated with the rotational position of an engine output shaft (crankshaft) of the internal combustion engine 1. The accelerator opening sensor 9 is a sensor which outputs an electrical signal correlated with an amount of operation (accelerator opening) of an unillustrated accelerator pedal. Then, the output signals of these sensors are inputted to the ECU 20. The ECU 20 derives an engine rotational speed of the internal combustion engine 1 based on the output signal of the crank position sensor 8, and also derives an engine load of the internal combustion engine 1 based on the output signal of the accelerator opening sensor 9. In addition, the ECU 20 estimates a flow rate of the exhaust gas discharged from the internal combustion engine 1 based on the output value of the air flow meter 43, and also estimates the temperature of the exhaust gas purification catalyst 70 based on the output value of the temperature sensor 51.

The ECU 20 is electrically connected to a variety of kinds of devices such as the individual fuel injection valves 3, the throttle valve 41, the WGV 603, etc. Thus, these variety of kinds of devices are controlled by the ECU 20. For example, the ECU 20 can adjust the flow rate of the exhaust gas flowing through the bypass passage 602, by controlling the degree of opening of the WGV 603.

Then, the ECU 20 controls the WGV 603 to the fully opened state, when the internal combustion engine 1 is in a cold state. With this, the bypass exhaust gas is made to direct to the central portion of the upstream side catalyst end face 70a, so that the heat of the bypass exhaust gas is transmitted to the exhaust gas purification catalyst 70 in an effective manner. Thus, the ECU 20 can promote the warming-up of the exhaust gas purification catalyst 70, by controlling the WGV 603 to the fully opened state when the internal combustion engine 1 is in the cold state.

<Structure of the Air Fuel Ratio Sensor>

Next, the structure of the air fuel ratio sensor 10 will be briefly explained based on FIG. 3 and FIG. 4. FIG. 3 is an enlarged schematic cross sectional view in the vicinity of the air fuel ratio sensor 10 in FIG. 1. Also, FIG. 4 is a vertical cross sectional view in the vicinity of a tip end of the air fuel ratio sensor 10.

In FIG. 3, the air fuel ratio sensor 10 is composed of a sensor body 100 to be described later, and a protective cover 10a which is a cylindrical heat-resistant member covering the sensor body 100, with a part thereof being exposed to the specific passage 5a. The sensor body 100 is covered with the protective cover 10a, so that its mechanical strength is ensured.

Then, as shown in FIG. 4, the protective cover 10a is composed of an inner cover 10b and an outer cover 10c. Then, a plurality of vent holes are formed in the surface of each of these inner and outer covers 10b, 10c, so that the inside and outside of the protective cover 10a are made in communication with each other. That is, the air fuel ratio sensor 10 is constructed so that the exhaust gas circulating or flowing in the specific passage 5a passes through the vent holes 10d in the protective cover 10a and reaches the sensor body 100. Here, note that in FIG. 4, the protective cover 10a has a dual structure, but it may have a single structure.

Next, the schematic construction of the sensor body 100 will be explained. The sensor body 100 is provided with a sensor element 11 which is composed of an oxygen ion conductive solid electrolyte. The sensor element 11 is composed of zirconium oxide (zirconia). Then, the sensor element 11 is formed on one side surface thereof with an exhaust side electrode 12 which is exposed to the exhaust gas, and on the other side surface thereof with an atmosphere side electrode 13 which is exposed to the atmosphere. These exhaust side electrode 12 and atmosphere side electrode 13 are each composed of a metallic material of high catalytic activity, such as platinum. Thus, the exhaust side electrode 12 and the atmosphere side electrode 13 are formed in this manner, whereby the sensor element 11 is sandwiched by a pair of electrodes.

Then, a diffusion rate controlling layer 14 is laminated on one side surface of the exhaust side electrode 12 opposite to its side surface near the sensor element 11. The diffusion rate controlling layer 14 is a member which is composed of a porous material such as ceramics, etc., and which has a function to control the rate or speed of diffusion of the exhaust gas. Also, a protective layer 16 is laminated on one side surface of the diffusion rate controlling layer 14 opposite to its side surface near the sensor element 11. Then, a gas chamber 15 is formed between the sensor element 11 and the diffusion rate controlling layer 14. Here, note that it is not necessarily required to form the gas chamber 15, but it may instead be constructed so that the diffusion rate controlling layer 14 is in direct contact with the surface of the exhaust side electrode 12.

In addition, a heater layer 17 is laminated on the other side surface of the sensor element 11. A heater 18 is embedded in the heater layer 17, and the heater 18 can be supplied with electric power from an unillustrated outside electric circuit, so that it can heat the sensor body 100. Here, note that this electric circuit is electrically connected to the ECU 20, so that the electric power supplied to the heater 18 is controlled by the ECU 20. Then, an atmospheric chamber 19 is formed between the sensor element 11 and the heater layer 17. The atmospheric chamber 19 is placed in communication with the atmosphere through unillustrated atmospheric holes, so that even in a state where the air fuel ratio sensor 10 is arranged in the specific passage 5a, the atmosphere side electrode 13 is maintained in a state where it is exposed to the atmosphere.

In such an air fuel ratio sensor 10, the exhaust gas introduced into the interior of the protective cover 10a from the vent holes 10d passes through the diffusion rate controlling layer 14, and reaches the exhaust side electrode 12. Then, when an application voltage is applied between the exhaust side electrode 12 and the atmosphere side electrode 13, oxygen in the exhaust gas or oxygen in the atmosphere becomes oxygen ions, which propagate through the sensor element 11. Then, the air fuel ratio of the exhaust gas is detected based on a saturation current value (limiting current value) at this time. Here, in the sensor element 11, oxygen ions do not propagate until the temperature of the sensor element 11 becomes equal to or higher than its activation temperature. Accordingly, in cases where the temperature of the sensor element 11 is lower than the activation temperature, the sensor body 100 is heated to a desired temperature (e.g., 700 degrees C.) by means of the heater 18.

<Arrangement Structure of the Air Fuel Ratio Sensor>

As mentioned above, in cases where the temperature of the sensor element 11 is lower than its activation temperature, oxygen ions do not propagate in the sensor element 11. For that reason, when the internal combustion engine 1 is in the cold state, the sensor body 100 is heated by the heater 18. On the other hand, when the internal combustion engine 1 is in the cold state, moisture in the exhaust gas can become condensed water in the exhaust passage 5, the specific passage 5a, the turbine 60a, a turbine scroll (unillustrated), and the bypass passage 602. Here, if the air fuel ratio sensor 10 is wetted with the condensed water, the wetting of the sensor body 100 may accordingly be caused, too. In cases where the sensor body 100 has been wetted with the water, the sensor element 11 heated by the heater 18 is cooled rapidly, thereby giving rise to a fear that the sensor element 11 may be broken. In addition, in cases where the sensor body 100 has been wetted with water, it may become impossible to detect the air fuel ratio of the exhaust gas in an accurate manner. Thus, there is a fear that when the air fuel ratio sensor 10 arranged in the specific passage 5a gets wet with the condensed water, abnormality may occur in the air fuel ratio sensor 10. Here, note that a sensor in which the abnormality as mentioned above may occur is not limited to the air fuel ratio sensor 10, but the same abnormality may also occur in a sensor (e.g., an oxygen sensor, an NOx sensor, or the like) which has a sensor element composed of an oxygen ion conductive solid electrolyte, and a heater for raising the temperature of the sensor element. Accordingly, in cases where such sensors as the oxygen sensor, the NOx sensor, etc., are arranged in the specific passage 5a, each of these sensors also corresponds to an exhaust gas sensor in the present disclosure.

Moreover, when the internal combustion engine 1 is in the cold state, the ECU 20 controls the WGV 603 to the fully opened state, as mentioned above. In this case, the flow rate of the bypass exhaust gas becomes larger than the flow rate of the exhaust gas flowing out from the turbine 60a into the specific passage 5a (hereinafter, sometimes referred to as a "turbine exhaust gas"). In that case, the condensed water flowing out from the bypass passage 602 into the specific passage 5a has a tendency to direct to the central portion of the upstream side catalyst end face 70a, together with the bypass exhaust gas. Then, in the warming-up process of the exhaust gas purification catalyst 70, when the bypass exhaust gas containing the condensed water contacts or impinges against the upstream side catalyst end face 70a, the condensed water may boil in the upstream side catalyst end face 70a. When the boiling of the condensed water occurs in the upstream side catalyst end face 70a, a part of the moisture thus generated may splash or scatter from the upstream side catalyst end face 70a to the side of the specific passage 5a. Thus, when the moisture (backflow water) splashing or scattering from the upstream side catalyst end face 70a to the side of the specific passage 5a contacts or impinges against the air fuel ratio sensor 10, the wetting of the sensor body 100 as referred to above may occur, so that the abnormality of the air fuel ratio sensor 10 can be caused. Accordingly, the air fuel ratio sensor 10 in this embodiment is arranged in the specific passage 5a in a position in which the above-mentioned backflow water does not contact or impinge against the air fuel ratio sensor 10.

FIG. 5 is a view for explaining an arrangement structure of the air fuel ratio sensor 10 according to this embodiment of the present disclosure. In FIG. 5, there is shown a longitudinal sectional view of the turbine housing 60 and the specific passage 5a at the time when the WGV 603 is in the fully opened state in the cold state of the internal combustion engine 1. Then, a region A in FIG. 5 shows a region (hereinafter, sometimes referred to as a "bypass exhaust gas circulation region A") in which the bypass exhaust gas having flowed out from the bypass passage 602 into the specific passage 5a circulates or flows. In addition, a region B in FIG. 5 shows a region (hereinafter, sometimes referred to as a "scattering region B") in which the backflow water generated when the condensed water contained in the bypass exhaust gas has boiled on the upstream side catalyst end face 70a splashes or scatters.

Here, the bypass exhaust gas having flowed out from the bypass passage 602 into the specific passage 5a at the time when the WGV 603 is in the fully opened state flows directing to the central portion of the upstream side catalyst end face 70a, as mentioned above, but a part thereof may spread to some extent in a direction orthogonal to the extension line L1 of the axis of the bypass passage 602. For that reason, the bypass exhaust gas circulation region A becomes a region which spreads in a tapered shape along the extension line L1 of the axis of the bypass passage 602. Because of this, the location at which the bypass exhaust gas impinges against the upstream side catalyst end face 70a becomes a location (i.e., a predetermined location) including the central portion of the upstream side catalyst end face 70a and a periphery of the central portion. Then, the backflow water generated when the condensed water contained in the bypass exhaust gas boils at the above-mentioned predetermined location is apt to splash or scatter from the predetermined location toward the side of the specific passage 5a in a direction parallel to the axial direction of the exhaust gas purification catalyst 70 (i.e., in a direction vertical to the upstream side catalyst end face 70a). In other words, the above-mentioned backflow water has a tendency to advance substantially vertically with respect to the upstream side catalyst end face 70a in a direction from the side of the upstream side catalyst end face 70a toward the side of the specific passage 5a. Accordingly, the scattering region B becomes a region in which the above-mentioned predetermined location is virtually extended to the side of the specific passage 5a along the axial direction of the exhaust gas purification catalyst 70.

Accordingly, in this embodiment, the air fuel ratio sensor 10 is arranged in a position separated by a first distance d1 or more with respect to the scattering region B in a direction orthogonal to the axial direction of the exhaust gas purification catalyst 70 (i.e., in a direction parallel to the upstream side catalyst end face 70a). In that case, the scattering region B has been specified in advance based on the results of experiments or simulations. In addition, a part of the backflow water may scatter, while spreading in the direction orthogonal to the axial direction of the exhaust gas purification catalyst 70. Thus, the first distance d1 is set to a distance at which the backflow water scattering while spreading in the direction orthogonal to the axial direction of the exhaust gas purification catalyst 70 does not contact or impinge against the air fuel ratio sensor 10. Such a first distance d1 has been obtained in advance based on the results of experiments or simulations.

As stated above, when the air fuel ratio sensor 10 is arranged in the specific passage 5a in the position in which the separation distance between the air fuel ratio sensor 10 and the scattering region B in the direction orthogonal to the axial direction of the exhaust gas purification catalyst 70 becomes equal to or more than the first distance d1, the exhaust gas sensor 10 can be suppressed from getting wet with water, resulting from the backflow water generated when the condensed water contained in the bypass exhaust gas has boiled on the upstream side catalyst end face 70a.

Here, note that in the example shown in FIG. 5, the air fuel ratio sensor 10 is arranged in a position upwardly of the scattering region B, within the region in which the separation distance between the air fuel ratio sensor 10 and the scattering region B in the direction orthogonal to the axial direction of the exhaust gas purification catalyst 70 becomes equal to or more than the first distance d1, but it is not limited to such an arrangement. For example, the air fuel ratio sensor 10 may be arranged in a position sidewardly of the scattering region B, etc., as long as it is in the region in which the separation distance between the air fuel ratio sensor 10 and the scattering region B in the direction orthogonal to the axial direction of the exhaust gas purification catalyst 70 becomes equal to or more than the first distance d1. However, the condensed water accumulated in the vicinity of a bottom portion of the specific passage 5a is apt to splash or scatter to positions which are downwardly of the scattering region B, within the region in which the separation distance between the air fuel ratio sensor 10 and the scattering region B in the direction orthogonal to the axial direction of the exhaust gas purification catalyst 70 becomes equal to or more than the first distance d1. For that reason, it is desirable that the air fuel ratio sensor 10 be not arranged in a position downwardly of the scattering region B, within the region in which the separation distance between the air fuel ratio sensor 10 and the scattering region B in the direction orthogonal to the axial direction of the exhaust gas purification catalyst 70 becomes equal to or more than the first distance d1. Further, in cases where in the region in which the separation distance between the air fuel ratio sensor 10 and the scattering region B in the direction orthogonal to the axial direction of the exhaust gas purification catalyst 70 becomes equal to or more than the first distance d1, there exists a portion overlapping with the above-mentioned bypass exhaust gas circulation region A, it is desirable that the air fuel ratio sensor 10 be not arranged in the overlapping portion, either. Thus, when the arrangement of the air fuel ratio sensor 10 is decided in this manner, it is possible to suppress the wetting of the air fuel ratio sensor 10 resulting from the condensed water contained in the bypass exhaust gas.

In addition, in the example shown in FIG. 5, the air fuel ratio sensor 10 is mounted on the upstream side conical portion 7b of the catalyst casing 7. Here, the channel cross section of the conical portion 7b is larger than the channel cross section of the specific passage 5a at the upstream side of the conical portion 7b. For that reason, when the air fuel ratio sensor 10 is arranged in the conical portion 7b, it will be easy to make longer the separation distance between the air fuel ratio sensor 10 and the scattering region B in the direction orthogonal to the axial direction of the exhaust gas purification catalyst 70. As a result, it becomes easy to suppress the wetting of the air fuel ratio sensor 10 due to the backflow water in a more reliable manner. However, the air fuel ratio sensor 10 may be arranged in a position other than the conical portion 7b, as long as it is within the region in which the separation distance between the air fuel ratio sensor 10 and the scattering region B in the direction orthogonal to the axial direction of the exhaust gas purification catalyst 70 becomes equal to or more than the first distance d1.

(Second Embodiment)

Next, reference will be made to a second embodiment of the present disclosure based on FIG. 6. Here, note that in this second embodiment, the detailed explanation of substantially the same construction as in the above-mentioned first embodiment will be omitted.

When the internal combustion engine 1 is in a cold state, condensed water may be generated in the turbine 60a or the turbine scroll (unillustrated). The condensed water generated in the turbine 60a, the turbine scroll, etc., may flow out into the specific passage 5a together with the exhaust gas flowing out from the turbine outlet portion 601 (turbine exhaust gas). When the condensed water having flowed out from the turbine 60a into the specific passage 5a contacts or impinges against the air fuel ratio sensor 10, the abnormality of the air fuel ratio sensor 10 as mentioned above may be caused. Accordingly, in this second embodiment, in the aforementioned region which is not contacted or impinged by the backflow water, the air fuel ratio sensor 10 is arranged in a position in which the condensed water flowing out from the turbine outlet portion 601 does not contact or impinge against the air fuel ratio sensor 10.

FIG. 6 is a view for explaining an arrangement structure of the air fuel ratio sensor 10 according to this second embodiment of the present disclosure. In FIG. 6, there is shown a longitudinal sectional view of the turbine housing 60 and the specific passage 5a at the time when the WGV 603 is in the fully opened state in the cold state of the internal combustion engine 1. Moreover, in FIG. 6, there is shown, in addition to the bypass exhaust gas circulation region A and the scattering region B mentioned above, a region C (hereinafter, sometimes referred to as a "turbine condensed water circulation region C") in which the condensed water having flowed out from the turbine 60a into the specific passage 5a circulates or flows.

Here, the exhaust gas having flowed out from the turbine 60a into the specific passage 5a flows spirally, while swirling around the central axis of the turbine 60a. On the other hand, the specific gravity of the condensed water is larger than the specific gravity of the exhaust gas, so the condensed water having flowed out from the turbine 60a into the specific passage 5a tends to easily advance linearly in a direction parallel to the axial direction of the turbine outlet portion 601. In other words, the condensed water having flowed out from the turbine 60a into the specific passage 5a has a tendency to advance from the turbine outlet portion 601 toward the side of the specific passage 5a substantially vertically with respect to an end face of the turbine outlet portion 601. Accordingly, the turbine condensed water circulation region C becomes a region in which the end face of the turbine outlet portion 601 is extended to the side of the specific passage 5a along the axial direction of the turbine outlet portion 601.

Accordingly, in this second embodiment, the air fuel ratio sensor 10 is arranged within the region in which the separation distance between the air fuel ratio sensor 10 and the scattering region B in the direction orthogonal to the axial direction of the exhaust gas purification catalyst 70 becomes equal to or larger than the first distance d1, and in a position in which a separation distance between the air fuel ratio sensor 10 and the turbine condensed water circulation region C in the direction orthogonal to the axial direction of the turbine outlet portion 601 becomes equal to or larger than a second distance d2. In that case, the turbine condensed water circulation region C has been specified in advance based on the results of experiments or simulations. In addition, a part of the condensed water flowing out from the turbine 60a into the specific passage 5a may advance, while spreading in the direction orthogonal to the axial direction of the turbine outlet portion 601. For that reason, the second distance d2 is set to a distance at which the condensed water advancing while spreading in the direction orthogonal to the axial direction of the turbine output portion 601 does not contact or impinge against the exhaust gas sensor 10. Such a second distance d2 has been set in advance based on the results of experiments or simulations.

As described above, when the air fuel ratio sensor 10 is arranged in the specific passage 5a within the region in which the separation distance between the air fuel ratio sensor 10 and the scattering region B in the direction orthogonal to the axial direction of the exhaust gas purification catalyst 70 becomes equal to or larger than the first distance d1, and in the position in which the separation distance between the air fuel ratio sensor 10 and the turbine condensed water circulation region C in the direction orthogonal to the axial direction of the turbine outlet portion 601 becomes equal to or larger than the second distance d2, it is possible to suppress the wetting of the air fuel ratio sensor 10 resulting from the condensed water contained in the turbine exhaust gas, too, in addition to the wetting of the air fuel ratio sensor 10 resulting from the backflow water.

Here, note that in the example shown in FIG. 6, the air fuel ratio sensor 10 is arranged within a region in which the separation distance between the air fuel ratio sensor 10 and the scattering region B in the direction orthogonal to the axial direction of the exhaust gas purification catalyst 70 becomes equal to or larger than the first distance d1, and in which the separation distance between the air fuel ratio sensor 10 and the turbine condensed water circulation region C in the direction orthogonal to the axial direction of the turbine outlet portion 601 becomes equal to or larger than the second distance d2, and in a position upwardly of the turbine condensed water circulation region C, but the arrangement of the air fuel ratio sensor 10 is not limited to this. For example, if the air fuel ratio sensor 10 is arranged within the region in which the separation distance between the air fuel ratio sensor 10 and the scattering region B in the direction orthogonal to the axial direction of the exhaust gas purification catalyst 70 becomes equal to or larger than the first distance d1, and in which the separation distance between the air fuel ratio sensor 10 and the turbine condensed water circulation region C in the direction orthogonal to the axial direction of the turbine outlet portion 601 becomes equal to or larger than the second distance d2, and in a position in which the condensed water accumulated in the bottom portion of the specific passage 5a does not contact or impinge against the air fuel ratio sensor 10, the same effects or advantages as those in the arrangement example of FIG. 6 can be obtained. Further, in cases where a portion overlapping with the above-mentioned bypass exhaust gas circulation region A exists in the region in which the separation distance between the air fuel ratio sensor 10 and the scattering region B in the direction orthogonal to the axial direction of the exhaust gas purification catalyst 70 becomes equal to or larger than the first distance d1, and in which the separation distance between the air fuel ratio sensor 10 and the turbine condensed water circulation region C in the direction orthogonal to the axial direction of the turbine outlet portion 601 becomes equal to or larger than the second distance d2, the air fuel ratio sensor 10 is not arranged in the overlapping portion, thereby making it possible to suppress the wetting of the air fuel ratio sensor 10 resulting from the condensed water contained in the bypass exhaust gas, too.

In addition, in the example shown in FIG. 6, the air fuel ratio sensor 10 is mounted on the upstream side conical portion 7b of the catalyst casing 7. This is because the channel cross section of the conical portion 7b is larger than the channel cross section of the specific passage 5a at the upstream side of the conical portion 7b, thus making it easy to increase the separation distance between the air fuel ratio sensor 10 and the scattering region B in the direction orthogonal to the axial direction of the exhaust gas purification catalyst 70, and the separation distance between the air fuel ratio sensor 10 and the turbine condensed water circulation region C in the direction orthogonal to the axial direction of the turbine outlet portion 601. As a result, it becomes easy to suppress the wetting of the air fuel ratio sensor 10 resulting from the backflow water, and the wetting of the air fuel ratio sensor 10 resulting from the condensed water contained in the turbine exhaust gas in a more reliable manner. Further, the position of the conical portion 7b when seen from the turbine outlet portion 601 is a secluded position away in the radial direction of the specific passage 5a, thereby providing an advantage that it is easy to suppress the wetting of the sensor element 11 resulting from the condensed water contained in the turbine exhaust gas in a more reliable manner. However, the air fuel ratio sensor 10 may be arranged in a position other than the conical portion 7b as long as it is within the region in which the separation distance between the air fuel ratio sensor 10 and the scattering region B in the direction orthogonal to the axial direction of the exhaust gas purification catalyst 70 becomes equal to or larger than the first distance d1, and in which the separation distance between the air fuel ratio sensor 10 and the turbine condensed water circulation region C in the direction orthogonal to the axial direction of the turbine outlet portion 601 becomes equal to or larger than the second distance d2.

(Modification of the Second Embodiment) In the above-mentioned second embodiment, there has been described an example where the wetting of the sensor element 11 due to the condensed water is suppressed, in a construction in which the exhaust passage 5 connected to the exhaust manifold 50 extends at one end thereof toward an upper side in the vertical direction in the vehicle-mounted state, and the other end of the exhaust passage 5, which is opposite to the side connected to the exhaust manifold 50, is connected to the turbine housing 60, i.e., in a construction in which the position of the turbine 60a in the turbine housing 60 is arranged upper in the vertical direction than the bypass passage 602.

In contrast to this, as shown in FIGS. 7A-7B, there can also be considered a construction in which the exhaust passage 5 connected to the exhaust manifold 50 extends at one end thereof toward a lower side in the vertical direction, and the other end of the exhaust passage 5, which is opposite to the side connected to the exhaust manifold 50, is connected to the turbine housing 60, i.e., a construction in which the position of the turbine 60a in the turbine housing 60 is arranged lower in the vertical direction than the bypass passage 602.

In the construction as shown in FIGS. 7A-7B, too, the air fuel ratio sensor 10 is arranged within the region in which the separation distance between the air fuel ratio sensor 10 and the scattering region B in the direction orthogonal to the axial direction of the exhaust gas purification catalyst 70 becomes equal to or larger than the first distance d1, and in the position in which the separation distance between the air fuel ratio sensor 10 and the turbine condensed water circulation region C in the direction orthogonal to the axial direction of the turbine outlet portion 601 becomes equal to or larger than the second distance d2, as shown in FIG. 8, whereby the same effects or advantages as those in the above-mentioned second embodiment can be obtained.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

What is claimed is:

1. An exhaust system for an internal combustion engine comprising:
    a supercharger with a turbine that is arranged in an exhaust passage of the internal combustion engine;
    an exhaust gas purification catalyst that is arranged in the exhaust passage at a location downstream of the turbine;
    a bypass passage that branches from the exhaust passage at a location upstream of the turbine, and merges into the exhaust passage at a location upstream of the exhaust gas purification catalyst, while bypassing the turbine;
    a waste gate valve that changes an exhaust gas channel cross section in the bypass passage; and
    an exhaust gas sensor that is arranged in a specific passage which is a portion of the exhaust passage between the turbine and the exhaust gas purification catalyst;
    wherein the turbine and the exhaust gas purification catalyst are arranged in such a manner that they are in a predetermined proximity state, and that an extension line of an axis of an outlet portion of the turbine intersects an upstream side end face of the exhaust gas purification catalyst, without intersecting a wall surface of the specific passage;
    the bypass passage and the waste gate valve are constructed such that a bypass exhaust gas, which is an exhaust gas flowing out from the bypass passage when a degree of opening of the waste gate valve is equal to or larger than a predetermined degree of opening, flows so as to direct to a predetermined portion which is a part of the upstream side end face of the exhaust gas purification catalyst; and
    the exhaust gas sensor is arranged to be away, a first distance or more in a direction orthogonal to an axial direction of the exhaust gas purification catalyst, from a region in which the predetermined portion is virtually extended to a side of the specific passage along the axial direction of the exhaust gas purification catalyst.

2. The exhaust system for an internal combustion engine as set forth in claim 1, wherein
    the exhaust gas sensor is arranged in a position which is away, the first distance or more in a direction orthogonal to the axial direction of the exhaust gas purification catalyst, from the region in which the predetermined portion is virtually extended to the side of the specific passage along the axial direction of the exhaust gas purification catalyst, and which is further separated, by a second distance or more in a direction orthogonal to the axial direction of the outlet portion, with respect to a region in which an end face of the outlet portion of the turbine is virtually extended to the specific passage side along the axial direction of the outlet portion.

3. The exhaust system for an internal combustion engine as set forth in claim 2, wherein
    the specific passage includes a tapered portion in which a passage diameter of the specific passage continuously increases from an intermediate portion extending from the turbine to the exhaust gas purification catalyst; and
    the exhaust gas sensor is arranged in the tapered portion.

4. The exhaust system for an internal combustion engine as set forth in claim 1, wherein
the specific passage includes a tapered portion in which a passage diameter of the specific passage continuously increases from an intermediate portion extending from the turbine to the exhaust gas purification catalyst; and
the exhaust gas sensor is arranged in the tapered portion.

* * * * *